(12) United States Patent
Häussermann

(10) Patent No.: US 6,415,640 B1
(45) Date of Patent: Jul. 9, 2002

(54) TOOL AND METHOD FOR MAKING A TOOL

(75) Inventor: Markus Häussermann, Heilbronn (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/414,438

(22) Filed: Oct. 7, 1999

(51) Int. Cl.[7] .............................................. B21D 22/00
(52) U.S. Cl. .............................. 72/350; 72/462; 72/476
(58) Field of Search ..................... 72/350, 462, 469, 72/476, 463, 464, 470, 474, 475; 76/107.1, 107.4; 100/214

(56) References Cited

U.S. PATENT DOCUMENTS

| | | | | | |
|---|---|---|---|---|---|
| 2,746,510 A | * | 5/1956 | Pedersen | ...................... | 72/469 |
| 3,563,167 A | * | 2/1971 | Pennell | ........................ | 100/214 |
| 3,566,642 A | * | 3/1971 | Whitacre | .................... | 76/107.1 |
| 4,096,729 A | * | 6/1978 | Dupler | ......................... | 72/350 |
| 4,227,396 A | * | 10/1980 | Crowe | ......................... | 72/469 |
| 4,601,867 A | * | 7/1986 | Martell et al. | .............. | 264/227 |
| 5,008,658 A | | 4/1991 | Russay et al. | | |
| 5,223,081 A | * | 6/1993 | Ryntz, Jr. | ................... | 148/538 |
| 5,388,357 A | | 2/1995 | Malita | | |
| 5,484,098 A | * | 1/1996 | Anttila et al. | ................. | 72/364 |
| 5,707,477 A | | 1/1998 | Cloud | | |
| 5,760,858 A | | 6/1998 | Hodson et al. | | |
| 5,944,087 A | * | 8/1999 | Sterett | ........................ | 164/130 |
| 6,047,580 A | * | 4/2000 | Fritz | ........................... | 72/15.2 |
| 6,185,978 B1 | * | 2/2001 | Sundgren et al. | ............. | 72/364 |

FOREIGN PATENT DOCUMENTS

| | | | | |
|---|---|---|---|---|
| DE | 197 56 516 A1 | 6/1999 | | |
| JP | 63-299825 A | 12/1988 | | |
| JP | 1-27726 | * 1/1989 | .................. | 72/350 |
| JP | 1-262029 | * 10/1989 | ................ | 76/107.1 |
| JP | 3-138032 A | 6/1991 | | |
| JP | 06 285547 | 2/1995 | | |
| JP | 07 051757 | 2/1995 | | |
| SU | 730392 | * 5/1980 | .................. | 72/469 |
| SU | 1180136 | * 9/1985 | .................. | 72/476 |
| SU | 1512694 | * 10/1989 | .................. | 72/350 |

OTHER PUBLICATIONS

Patent Abstracts of Japan, No. 6285547.
Patent Abstracts of Japan, No. 071757.

* cited by examiner

*Primary Examiner*—Ed Tolan
(74) *Attorney, Agent, or Firm*—Venable; Norman N. Kunitz

(57) ABSTRACT

In the present tool (2) for machining metallic, sheet-type molded parts (4), the tool (2) including at least one component (10–14) for exerting a force, at least one of the components (10–14) of the tool (2) is provided virtually parallel to the force-exertion direction of the component (10–14) with channel-like recesses (20) in a predetermined pattern, the recesses extending at least over a large portion of the length of the component (10–14) and having a predetermined cross section (38). These measures assure a uniform vertical pressure resistance that is attained with a low financial outlay. Consequently, the cost of machining the tool is reduced. The construction outlay can be reduced with simple, derivable construction rules.

18 Claims, 3 Drawing Sheets

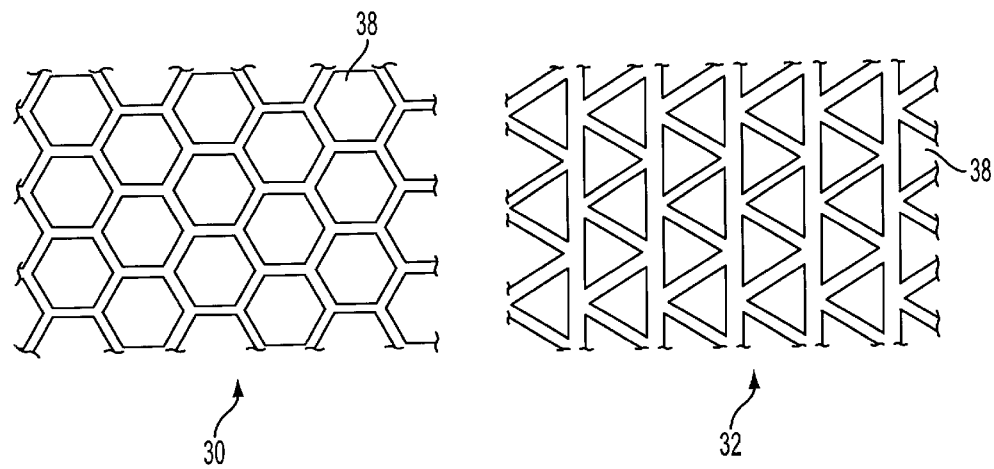
FIG. 2A
FIG. 2B
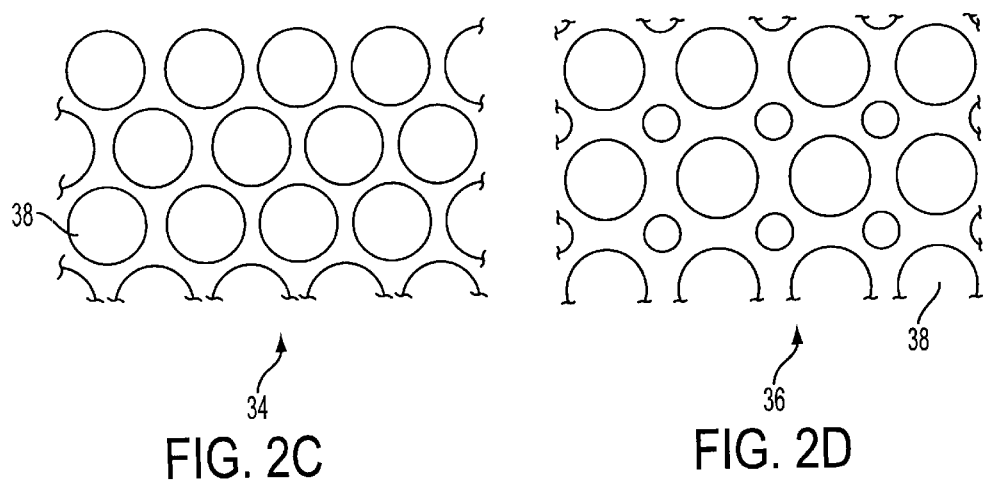
FIG. 2C
FIG. 2D

TOOL AND METHOD FOR MAKING A TOOL

BACKGROUND OF THE INVENTION

The invention relates to a cast or molded tool for machining, sheet-metal parts, and a method of producing such a tool.

Tools formed by casting are used almost exclusively in the fields of large tools for producing auto bodies. This trend arose, among other reasons, because of the flexibility of casting construction. Upon observing the ribbing of such tools, one predominantly finds constructions in which the ribs are orthogonal to one another and orthogonal to the base surface of the tool. In technical language, 'ribbing' is the provision of the tool with recesses in an effort to reduce its weight. The embodiments known from the state of the technology are oriented in appearance toward welded constructions.

Welded constructions are assembled from individual plates that lend these tools their typical appearance. The outcome of this design is poor force courses. Especially in drawing tools, there are locations at the drawing-part flange, between the hold-down device and die plate, at which high surface pressures occur due to the ribbing underneath. In contrast, only a low surface pressure is present between the ribs, namely in the region above the recesses. For this reason, the drawing-frame surfaces of the hold-down device and the die plate must be thick to reduce the undesired side effects.

The primary objective of the die plate/hold-down device system is to clamp the sheet at the flange such that no folds are formed in the sheet due to the tangential compressive strains during the drawing-in process, and the material flow between the die plate and the hold-down device is optimally controlled by way of locally-varying surface pressures. The surface pressure cannot be too high, or cracks will occur. Folds are formed when the surface pressure is too low. Therefore, the sheet must be able to continue flowing within the two failure limits of "cracks" and "folds."

Tests reveal that, with a relatively rigid bedplate and press ram, the horizontal bending resistance of the tool components has an insignificant effect on the surface pressure at the drawing-part flange. The vertical pressure resistance of the tool components is practically the only relevant characteristic.

The tool structures that have traditionally been used up to this time have a high pressure resistance in the surface of the hold-down device, above the ribs, whereas the pressure resistance between the ribs is very low. The objective is to attain the most uniform vertical pressure resistance possible; the horizontal bending resistance is inconsequential.

"Intelligent die cushions" are being used more and more frequently. These cushions permit the center-sleeve forces or levels to be controlled individually during the drawing process, and thus a purposeful influence of the surface pressure at the drawing-part flange. Tests of the function of the hold-down device show that only one hold-down device having a high vertical pressure resistance uniformly transmits the center-sleeve forces to a defined surface at the drawing-part flange. The bending resistance is also of little consequence here.

It is the object of the invention to provide a tool for machining, sheet-metal parts, the tool having a high, uniform vertical pressure resistance that is attained with a low financial outlay. Furthermore, a method for producing the tool is disclosed.

SUMMARY OF THE INVENTION

The above object is accomplished according to the invention by a cast or molded tool for machining sheet-metal parts, the tool having at least one component for exerting a force wherein at least one of the tool components possesses channel-like recesses that are arranged in a sort of pattern virtually parallel to the direction of the exertion of force by the aforementioned component. The channel-like recesses extend at least over a large portion of the length of the component, and have the same predetermined cross section.

The ribbing of the tool base body, i.e., the tool components provided with channel-like recesses, assures a high vertical and locally-uniform pressure resistance of the tool components, which is an essential criterion for the optimum distribution of the forces. Because of the relatively-small hollow spaces, and the thin walls between the hollow spaces, large amounts of mass can be omitted. This is also especially the case because a smaller thickness of the drawing-belt surface is necessary above the smaller hollow spaces due to the fact that far less bowing occurs in the smaller, unsupported regions. In addition, smaller hollow spaces can be better arranged for avoiding larger, non-ribbed regions in the edge zones. The better rigidity properties for a lower material cost significantly reduce the costs of producing the tool.

The uniform vertical rigidity that is already present greatly reduces the spot-grinding costs. Spot-grinding is a machining process in which a uniform surface pressure is attained through the manual removal of material from the tool. Because spot-grinding is highly labor-intensive, the reduction in the spot-grinding outlay can contribute greatly to cost savings.

The use of channel-like recesses having simple geometric base surfaces is ideally suited for computer-aided tool design, because the hollow spaces can be adapted into the tool base body by means of simple algorithms, which can save a considerable amount of weight.

The construction times for the tool base bodies can be drastically reduced, which is synonymous with large cost savings.

The cross section of the channel-like recesses is preferably circular. The use of cylinder-type hollow spaces as the channel-like recesses assures the simplest type of design of tool base bodies having a prismatic ribbing. As their cross section, the cylinders have circular surfaces of identical diameter, which can be inserted into the cross-sectional surface of the tool base body with very simple algorithms. This ribbing variation is therefore ideal for the automated design of the tool base body employing CAD (Computer-Aided Design).

Simple rules can be established for determining the dimensions and surface ratios in the ribbing cross section. For example, the minimum wall thickness between the hollow spaces corresponds to the respective material viscosity, or its ability to be cast.

The supporting surface component can be derived from the required tool rigidity. The diameter of the channel-like recesses can be determined with the minimum wall thickness and the supporting surface component.

The cylinders are drawn, perpendicular to the tool base surface, to an upper auxiliary construction surface that extends parallel to the surface of the drawing belt. Various amounts of weight can be saved, depending on the stamp contour and the cylinder arrangement in the cross-sectional surface.

In particular, the cross section can possess different diameters. The prismatic ribbing with cylinders of varying diameters is based on the same principle as the aforementioned ribbing variation with a constant diameter. In the automated ribbing of the tool base body, however, more complex algorithms are required for arranging the cylinders in the ribbing cross section. In principle, the number of cylinder diameters should be kept small to permit the use of simpler algorithms.

An ideal diameter for the largest cylinders can be determined for the required minimum wall thickness and the necessary supporting surface component. If smaller cylinders are to be disposed between the larger cylinders, there is a diameter for the smaller cylinders that permits a suitable utilization of the optimum minimum wall thickness. For the next-smaller cylinders, there is again a unique optimum diameter. On this basis, a unique and optimum graduation of cylinder diameters can be determined for the initial conditions of minimum wall thickness and supporting surface component.

Usually, two to three different diameters are adequate for further reducing the tool weight if the surface component that actually provides support lies above the minimum required supporting surface because of the minimum required wall thickness. Moreover, edge regions can be better filled with hollow spaces because of the available smaller cylinder diameters. This is particularly advantageous in the case of irregular stamp contours.

In a further embodiment, the cross section of the channel-shaped recesses is polygonal, particularly hexagonal. Honeycomb-like structures (particularly hexagonal structures) have already made their way into most fields of application for lightweight construction; examples include packaging materials and aircraft construction. The reason for this is the high rigidity of such a structure relative to its low weight. The honeycomb-like structures ideally have a high pressure resistance in the axial direction of the honeycombs. Thus, this structure meets the aforementioned conditions for an ideal ribbing of the tool base body. The honeycombs need not necessarily emulate the hexagonal honeycombs of bees. In principle, completely-different types of prismatic structures can be used.

In particular, the tools structured in this manner can be used for deep-drawing, copying, cutting or beveling.

The object is accomplished by a method of producing a tool, in which a foundry pattern for at least one of the components is constructed from an extruded model block (such as Exporit or Styropor) in which channel-like recesses are already cut, and a model plate that is disposed on the extruded model block, both comprising the same materials.

BRIEF DESCRIPTION OF THE DRAWING

The invention is described in detail by embodiments illustrated in the drawings, wherein:

FIGS. 2a–2d are cross-sections through different ribbing geometries; and

DETAILED DESCRIPTION OF THE PREFERRED EMBODIMENTS

Figure 1:
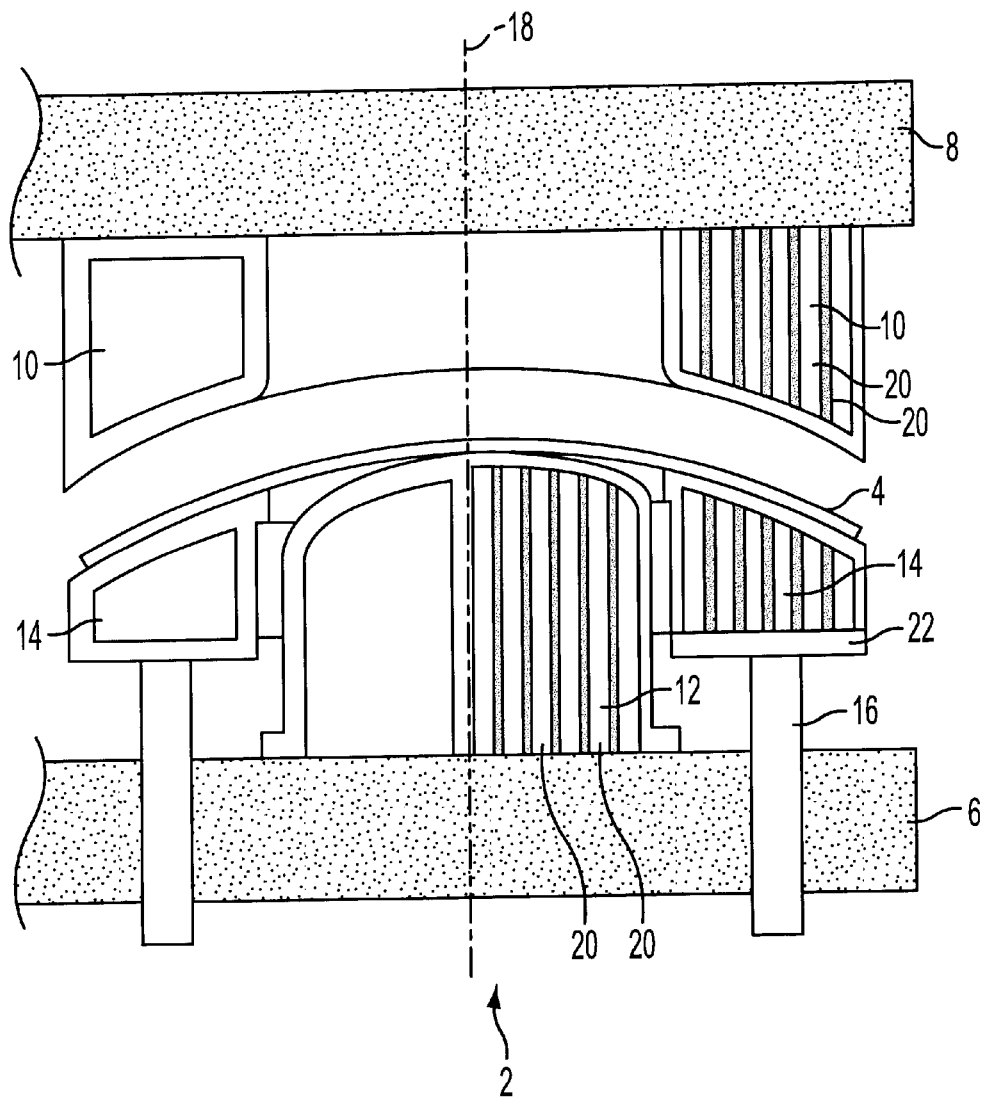
FIG. 1 is a schematic side view of a cast tool for machining, sheet-metal parts.

FIG. 1 is a schematic side view of a tool 2 for machining a sheet-molded part 4. The tool 2 functions as a drawing tool; components 10 through 14 are disposed between a bedplate 6 and a press ram 8. The components 10 through 14 are embodied here as a die plate, a drawing punch and a hold-down device, respectively.

The hold-down device (component 14) is disposed to move between the press ram 8 and the bedplate 6 by way of a center sleeve 16. The individual components 10 through 14 can move along the axis 18 in both directions, the respective force-exertion directions, during the machining process. The components 10 through 14 thus exert a force on the shaped part 4. The force-exertion direction of the components 10 through 14 is likewise defined by the axis 18. The components 10 through 14 each have channel-like recesses 20 that are disposed virtually parallel to the force-exertion direction of the components 10 through 14. These recesses extend over a large portion of the length of the components 10 through 14, and have a predetermined cross section. The channel-like recesses are disposed in a uniform pattern (see also FIG. 2).

In a further embodiment, not shown, only one component for exerting a force has channel-like recesses. It is therefore not necessary for all of the components 10 through 14 of the tool 2 to be provided with channel-like recesses. In corresponding embodiments, not shown, the tool is also suitable for copying, cutting and/or beveling sheet-metal parts.

The primary task of the die plate/hold-down device system 10–14 is to clamp the part 4 such that, during the drawing-in process, no folds are formed due to the tangential compressive strains, and the material flow between the die plate 10 and the hold-down device 14 is optimally controlled by way of locally-varying surface pressures. The surface pressure cannot be too high, or cracks will occur. Folds are formed if the surface pressure is too low. Therefore, the sheet must be able to continue flowing in a set manner within the two failure limits.

The point of departure for the embodiment of the tool base bodies is the information about the drawing-part geometry that yields the stamp contour, and the surface of the drawing belt. The dimensions of the drawing-belt surface yield the base surface of the tool raw material, or, in cast tools, the base surface of the model block produced from Exporit. Other materials are also suitable for the model blocks of the components 10 through 14 of the tool 2, however. The height of the raw material for the die plate is determined from the maximum drawing path.

The drawing-belt surface and the stamp contour are predetermined in the raw-material block. Two auxiliary construction surfaces are then determined. One of them is disposed parallel to the outer surface of the stamp 12, and defines he distance between the stamp 12 and the die plate 10. The second auxiliary construction surface is established by the minimum thickness of the functional surface of the drawing belt.

This thickness depends on the permissible bowing of the drawing-belt surface and the maximum diameter of the ribbing hollow spaces. The ribbing pattern, that is, the arrangement of the channel-like recesses and their cross section, is now selected. For this purpose, first the minimum wall thickness between neighboring channel-like recesses that is necessary for the respective casting material is determined. The goal is to attain the smallest-possible wall thickness.

In ribbing produced through mechanical machining, the wall thickness can be selected to be very small. The necessary supporting surface component is determined based on the necessary vertical pressure resistance of the components 10 through 14. The size of the cross sections can then be determined from this. The ribbing pattern of the raw-material block is subsequently worked into the base surface; in the process, the stamp contour is provided with recesses.

The ribbing hollow spaces are produced through the drawing of the ribbing pattern, parallel to the drawing-belt surface and perpendicular to the base surface of the tool, up to the auxiliary construction surface. The ribbing hollow spaces and the stamp recesses are then milled.

As the next step, two further auxiliary construction surfaces for the machining overmeasure are created parallel to the drawing-belt surface and the outside stamp surface. The functional surfaces with the corresponding overmeasures are milled. In cast tools, a second casting follows this step. Finally, the functional surfaces are mechanically machined.

On the side of the center sleeve, the hold-down device (component 14) has a cover plate 22 to make it applicable in drawing systems having different center-sleeve mold elements.

FIGS. 2a–2d show ribbing profiles 30 through 36. Generally, arbitrary patterns of round or polygonal contours can be used as ribbing patterns.

The ribbing geometry 30 (FIG. 2a) has channel-like recesses with a honeycomb-like, hexagonal cross section 38. Other polygonal cross sections, not shown, are also possible, however. The ribbing geometry 32 (FIG. 2b) has triangular cross sections 38, whereas the ribbing geometries 34 (FIG. 2c) and 36 (FIG. 2d) have circular cross sections 38. In the ribbing profile 34, the circular cross sections 38 are of a unified size, whereas in the ribbing profile 36, the cross sections 38 are provided with two different diameters.

The honeycomb-like ribbing geometry 30 yields a very high rigidity with a very low tool weight. Moreover, the surface pressure in the contact surface between the tool and the sheet is very uniform. The disadvantage is the milling outlay in producing Exporit models, which is significantly higher than the aforementioned ribbing geometries that include circular cross sections 38. Circular, rectangular or hexagonal contours are preferably used.

The ribbing strategy relates to a ribbing having a pattern of prismatic hollow spaces. These prismatic hollow spaces can have an arbitrary base surface that is drawn perpendicular, or nearly perpendicular, to the tool base surface and forms the hollow spaces. Small changes can occur in the shape and surface content of the cross-section surface over the extrusion path of the prismatic volume. The ribbing pattern includes a large number of prismatic hollow spaces (at least six per side of the tool base body) that are disposed in a regular pattern relative to one another.

Figure 3:
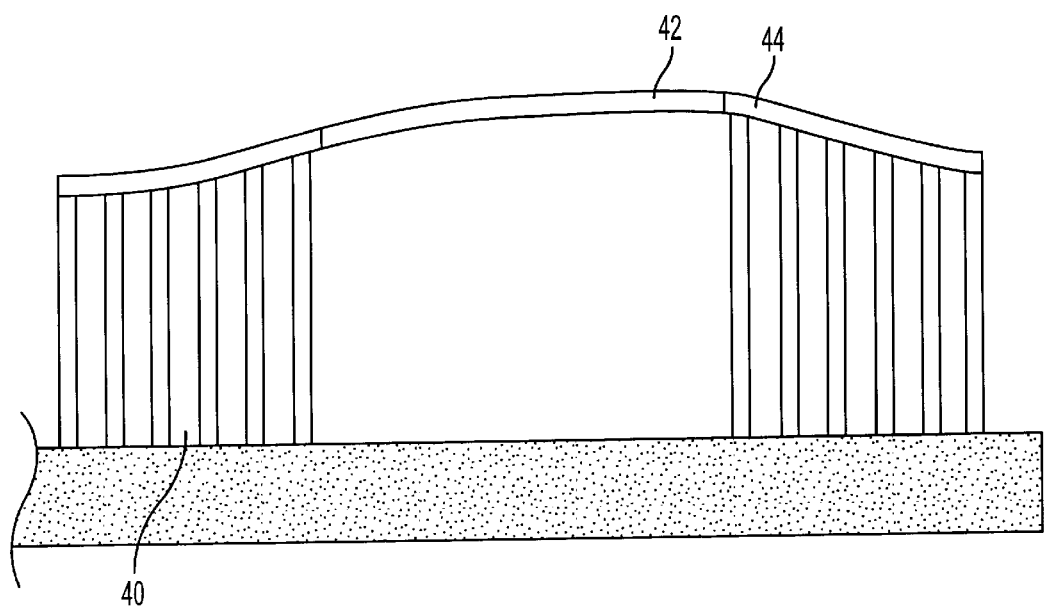
FIG. 3 shows a construction of a foundry pattern with extruded model blocks in a schematic representation.

As an alternative to producing the foundry model by milling a solid material, the model according to FIG. 3 can also be constructed with a prefabricated, extruded model block (40) in ribbed form, for example from Exporit. In this instance, the extruded model block (40) is milled parallel to the drawing-belt surface. The stamp recess (42) is also milled from the model block (40). A relatively-thin model plate (44) is glued onto the model block (40); the plate can also comprise Exporit. This method is especially well-suited for tools having level or slightly-curved drawing-belt surfaces. The production time for a foundry model can be reduced considerably in this way. In particular, the shortened times for the grinding machining reduce the production costs tremendously.

What is claimed is:

1. A cast tool for forming or cutting sheet-metal parts, the tool having at least one component for exerting a force for the forming or cutting operation, wherein at least one of the components of the tool has a plurality of channel-like recesses in a predetermined pattern with longitudinal axes virtually parallel to the force-exertion direction of the component, the channel-like recesses extending at least over a large portion of the length of the component and having a predetermined same cross section; a thin plate covers the recesses at the end facing the sheet metal part; and ribs formed between adjacent channel-shaped recesses are of a minimal same thickness.

2. The tool according to claim 1, wherein the cross section of the channel-shaped recesses is circular.

3. The tool according to claim 1, wherein the cross section of the channel-shaped recesses is polygonal, particularly hexagonal.

4. The tool according to claim 1 wherein the tool is a drawing tool that includes a die plate, a drawing punch and a hold-down device.

5. The tool according to claim 4, wherein the hold-down device has channel-like recesses and, on the side of a center sleeve, is provided with a cover plate, whereby the hold-down device can be used in drawing systems having different center-sleeve mold elements.

6. The tool according to claim 1 wherein the tool has a structure for deep-drawing, copying, cutting or beveling.

7. The tool according to claim 3, wherein the cross section of the channel-shaped recesses is hexagonal.

8. A cast tool for forming or cutting sheet-metal parts, said tool having at least one component for exerting a force for the forming or cutting; and wherein: at least one of the components of the tool has a plurality of channel-like recesses that are arranged in a uniform predetermined pattern to provide minimal spacing between adjacent channels, and that have their respective longitudinal axes extending virtually parallel to the force-exertion direction of the component, to form a pattern of thin ribs between the channels; the pattern of channel-like recesses extends at least over a large portion of the length of the component; a thin plate covers the recesses at the end facing the sheet-metal part; and the channel like recesses have a same predetermined cross section.

9. The tool according to claim 8, wherein the cross section of the channel-shaped recesses is circular.

10. The tool according to claim 8, wherein the cross section of the channel-shaped recesses is polygonal, and the pattern of ribs is prismatic.

11. The tool according to claim 10, wherein the cross section of the channel-shaped recesses is hexagonal, and the pattern is a honey-comb pattern.

12. The tool according to claim 8, wherein the tool is a drawing tool that include a die plate, a drawing punch and a hold-down device.

13. The tool according to claim 12, wherein: the hold-down device has the channel-like recesses extending from a rear side facing a center sleeve; and the rear side is provide with a cover plate over the recesses, whereby the tool can be used in drawing systems having different center-sleeve mold elements.

14. The tool according to claim 8, wherein the tool has a structure for one of deep-drawing, copying, cutting and beveling.

15. A cast tool for forming or cutting sheet-metal parts, the tool having at least one component for exerting a force for the forming or cutting operation, wherein at least one of the components of the tool has a plurality of channel-like recesses in a predetermined pattern with longitudinal axes extending virtually parallel to the force-exertion direction of the component, with the channel-like recesses extending at least over a large portion of the length of the component and having the same predetermined cross section; a thin layer of the same material from which the cast tool is made covers the recesses at the end facing the sheet metal part; and ribs formed between adjacent channel-shaped recesses are of a same minimum thickness that is smaller than a cross sectional dimension of the recesses.

16. A cast tool according to claim 15, wherein the recesses have a circular cross section.

17. A cast tool according to claim 15, wherein the recesses extend at least to the end of the tool facing the sheet metal part.

18. A cast tool according to claim 15, wherein the minimum thickness of the ribs between adjacent recesses is a minimum thickness determined by the material from which the tool is cast.

* * * * *